United States Patent [19]
Embree et al.

[11] Patent Number: 4,473,719
[45] Date of Patent: Sep. 25, 1984

[54] SWITCHHOOK STATUS DETECTOR

[75] Inventors: Milton L. Embree, Reading, Pa.; Dieter J. H. Knollman, Arvada, Colo.; Earl O. Martin, Temple, Pa.

[73] Assignee: AT&T Bell Laboratories, Murray Hill, N.J.

[21] Appl. No.: 378,518

[22] Filed: May 17, 1982

[51] Int. Cl.³ .............................................. H04M 3/22
[52] U.S. Cl. ................................................. 179/18 FA
[58] Field of Search ............ 179/18 FA, 18 HB, 84 R

[56] References Cited

U.S. PATENT DOCUMENTS

| | | | |
|---|---|---|---|
| 3,651,271 | 3/1972 | Knauer | 179/18 HB |
| 3,829,619 | 8/1974 | Close et al. | 179/18 HB |
| 4,087,646 | 5/1978 | Brolin et al. | 179/18 FA |
| 4,115,664 | 9/1978 | Laface et al. | 179/84 R |
| 4,164,713 | 8/1979 | Brolin et al. | 328/111 |
| 4,287,392 | 9/1981 | Melindo | 179/16 AA |
| 4,385,336 | 5/1983 | Takeshita et al. | 361/42 |
| 4,406,929 | 9/1983 | Pace et al. | 179/170 NC |

Primary Examiner—Thomas W. Brown
Attorney, Agent, or Firm—James M. Graziano

[57] ABSTRACT

The subject switchhook status detector is part of a battery feed circuit and functions to sense the magnitude of the current flowing on both the tip and ring conductors. The detector also generates a sum signal which represents the total metallic current flowing in the loop. The subject detector maintains the battery feed circuit in the off state until the sum signal exceeds a first predetermined threshold and, concurrently, both the tip and ring currents individually exceed another predetermined threshold. This combination of requirements prevents the generation of erroneous off-hook indications.

12 Claims, 7 Drawing Figures

SWITCHHOOK STATUS DETECTOR

FIELD OF THE INVENTION

This invention relates to telephone line circuits and, in particular, to an improved on-hook/off-hook status detector circuit which accurately determines the busy/idle status of a telephone line based on the actual value of the current flowing on each lead of the communication pair as well as the sum of the metallic currents flowing on the communication pair.

DESCRIPTION OF THE PRIOR ART

Prior art on-hook/off-hook detector circuits rely on monitoring either the voltage or the current of a single lead of the communication pair or the voltage across the communication pair or the sum of the TIP and RING currents of the communication pair to determine the busy/idle status of the communication pair. The difficulty with these arrangements is that the output of these prior art switchhook status circuits are unreliable in frequently encountered circumstances. For example, a partial or complete short of the ring lead of the communication pair to ground produces a steady current on this lead and, if this is the only lead that is monitored or if only voltages or the sum of TIP and RING currents is monitored, an off-hook condition appears to exist and an erroneous busy/idle status indication will be provided. Similarly, longitudinal signals can appear on the communication pair and these signals may be strong enough to cause an erroneous busy/idle status determination based on monitoring either the voltage or the current of a single lead of the communication pair.

DESCRIPTION OF THE INVENTION

The subject switchhook status detector circuit eliminates this erroneous busy/idle status problem of prior art detector circuits by sensing the magnitude of the actual current flowing on each of the conductors of the communication pair. The switchhook status detector circuit also generates a sum signal which represents the total metallic current flowing in the loop.

The subject switchhook status detector circuit maintains the battery feed associated with the communication pair in the off state until the current on the TIP conductor of the communication pair exceeds a first threshold, at which point the battery feed circuit powers up. When the battery feed circuit is powered up, the switchhook status detector circuit is enabled and can respond when the above-mentioned sum signal exceeds a second predetermined threshold. A third threshold circuit holds the hook status output low for an initial low current condition on the RING conductor of the communication pair. In addition, a current signal is fed from the output of the switchook status detector circuit to the input of a ringing current capability circuit to disable this circuit and prevent it from disturbing the off-hook status signal during subsequent periods of low current on the RING conductor of the communication pair. A second current signal is fed from the output to the input of a power gate threshold circuit to hold the output of this circuit in the high state, and to prevent the off-hook status signal from being disturbed during subsequent periods of low current on the TIP conductor of the communication pair.

Thus, in order to achieve an off-hook status output: first, the TIP current must exceed a predetermined threshold, second, the sum of TIP and RING currents must exceed a second threshold, and third, the RING current must exceed a third threshold. The need for preventing an off-hook indication when the RING current is very low is evident, when it is recognized that this is the condition for ringing the telephone. During ringing, the ring lead is open and large currents flow from the TIP lead to ground. These large currents could exceed the TIP current threshold and the sum of TIP and RING current thresholds. After an off-hook status output is achieved, this status is held until the sum of the TIP and RING currents falls below a fourth predetermined value. This independence of individual TIP and RING current values is necessary to prevent false hook status indications caused by, for example, large longitudinal currents which may be induced in the communication pair.

DETAILED DESCRIPTION OF THE DRAWINGS

The subject switchook status detector is part of an electronic battery feed circuit which functions to supply a predetermined current to a communication pair. The typical application of such a circuit is in a line interface circuit which connects a piece of subscriber equipment, such as a telephone station set, to the communication pair. This is a hostile environment in that oftentimes longitudinal signals are present, which signals are typically induced on the communication pair by colocated power lines. The longitudinal signals are fairly high in voltage magnitude and have an apparent large source impedance. A line interface circuit is limited in its operation range to its supply voltage. Thus, a line interface circuit is thereby also limited in its ability to handle longitudinal signals appearing on the communication pair. Unless the battery feed circuit is perfectly balanced, longitudinal signals can unbalance the battery feed circuit thereby affecting the metallic current supplied to the communication pair by the electronic battery feed circuit.

The battery feed circuit overcomes these limitations by presenting a low impedance to longitudinal signals. Obviously, this impedance affects the metallic current supplied to the communication pair by the battery feed circuit. However, the deleterious effects of the longitudinal current sink are cancelled by feedback techniques. In particular, the metallic current on the loop is monitored and compared with a reference which indicates the desired metallic current. An error signal is generated as a result of this comparison and this error signal is used to modify the drive applied to the communication pair.

This structure not only satisfies the basic battery feed requirements but also provides additional features and capabilities. In particular, the actual current on each of the communication leads is monitored and these signals provide an accurate on-hook/off-hook status indication when these signals and their sum are compared to predetermined thresholds, with the results of these comparisons being processed by the appropriate logic. It is also apparent that the terminating impedance presented to the communication pair can be controlled as can the battery feed load line characteristic. Thus, the battery feed circuit is flexible in its operation because by sensing the actual current flowing in each lead of the communication pair the circuit can modify both the dc current and ac impedance orthogonally without the adverse coupling effects of prior battery feed circuits.

Figure 1:
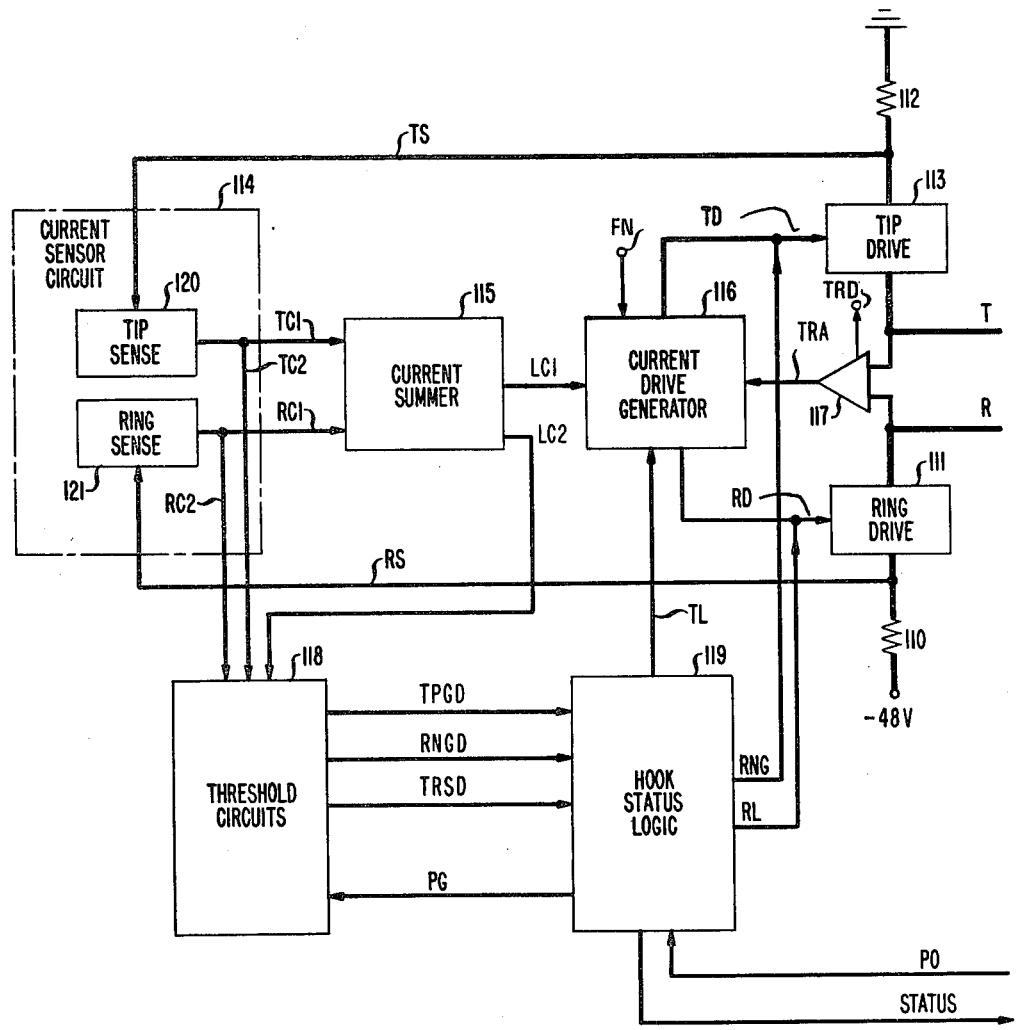
FIG. 1 illustrates the preferred embodiment of our invention in block diagram form.

The battery feed circuit with the switchook status detector is illustrated in block diagram form in FIG. 1. Loop current is supplied to the communication pair, leads R and T, by the drive generation circuitry consisting of resistor 110, ring drive 111 and resistor 112, tip drive 113, respectively. This drive generation circuitry serves to apply the proper battery voltage to the communication pair (R, T) and, at the same time, modify the current in the loop. To accomplish this, the drive circuits 111, 113 respond to the loop current control signals appearing on leads RD and TD, respectively.

It is the generation of these loop current control signals and the determination of hook status that is the function of the remaining circuitry illustrated in FIG. 1. In particular, this circuitry includes on-hook leakage drive and ringing current capability circuitry consisting of threshold circuits 118 and hook status logic 119. In addition, a feedback circuit consisting of current sensor circuit 114, current summer 115 and isolation amplifier 117 functions to precisely control the generation of the required currents on the communication pair (R, T).

In this feedback circuit, the actual values of the currents on leads R and T are monitored by current sensor circuit 114 via leads RS and TS respectively. The measured value of these currents are applied via leads RC1, and TC1 to current summer circuit 115 where the balanced longitudinal components are canceled. Current summer circuit 115 generates a metallic current sum signal to represent the actual metallic current on the communication pair (R, T) and this signal is applied to lead LC1. Current drive generator 116 subtracts the metallic current sum signal on lead LC1 from a reference signal which represents the desired metallic current and, as a result of this subtraction, passes an amplified error signal to the communication pair (R, T) via tip drive 113 and ring drive 111. The magnitude of the actual metallic currents is controlled via this feedback control loop by current drive generator 116 generating appropriate loop current control signals on leads RD and TD. The necessary relationship of these currents to maintain longitudinal balance is guaranteed by the precision of current sensor circuit 114 and current summer 115.

Longitudinal voltage suppression on the communication pair (R, T) is assured by another feedback loop consisting of isolation amplifier 117, current drive generator 116, tip drive 113 and ring drive 111. Isolation amplifier 117 monitors the common mode voltage appearing on the communication pair, leads R and T, and outputs a control signal on lead TRA to signify this voltage (where the common mode voltage is defined as one half the sum of the voltages on leads R and T). Current drive generator 116 uses this control signal to adjust the relative amount of drive that is applied to leads RD and TD to reduce the longitudinal potential at leads R and T of the communication pair.

To conserve power, the battery feed circuit is powered down during the on-hook state of the communication pair (R, T). Threshold circuits 118 and hook status logic 119 function to determine the on-hook/off-hook status of the communication pair (R, T) and, during the on-hook condition, generate a low level leakage drive current on leads RL and TL to supply the communication pair (R, T) with a low level current to monitor the hook status of the subscriber equipment connected to the communication pair (R, T). Additionally, hook status logic 119 supplies tip drive 113 with a ringing current control signal so that during one phase of ringing, a path is provided for ringing current to flow to circuit ground while during the other phase of ringing a path is provided to circuit ground by a protection diode (not shown).

To better understand the operation and capabilities of this circuit, the details of each of the blocks illustrated in FIG. 1 will be described in detail. The description will begin with the application of current to the communication pair (R, T) by the drive circuits (111, 113) and will trace the control of this current by the various other circuitry shown on FIG. 1

Ring Drive 111

Figure 4:
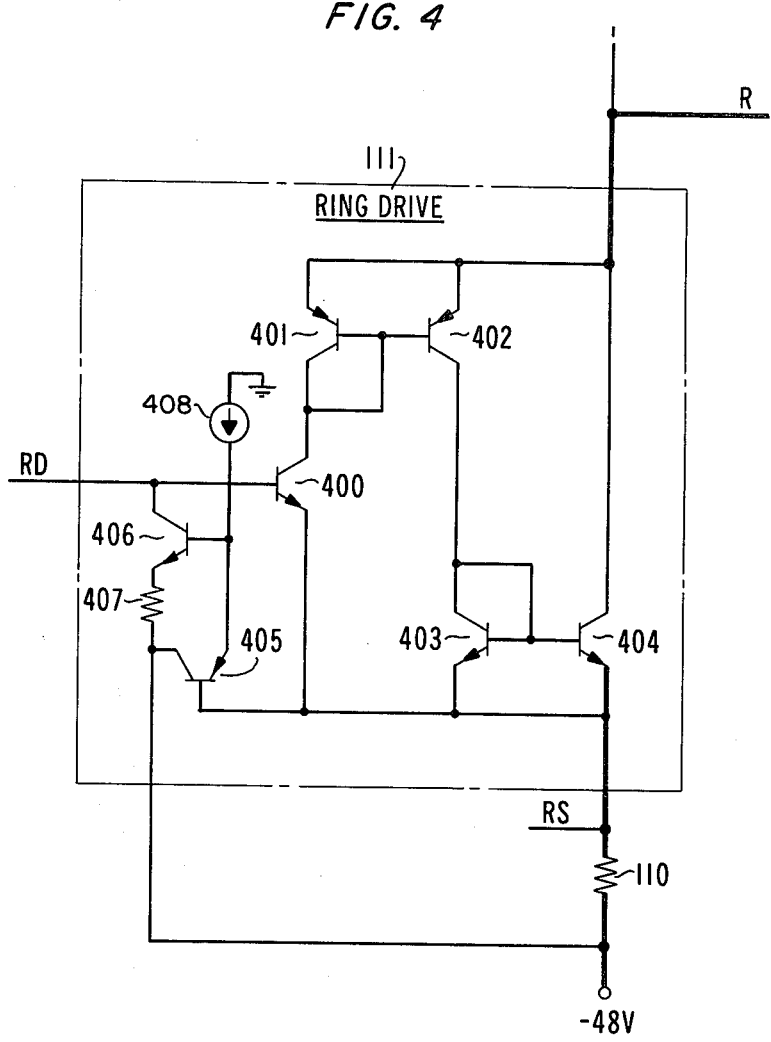
FIG. 4 illustrates the ring drive circuit of the subject switchhook status detector.

Ring drive 111 is illustrated in FIG. 4 and functions to control the drive current applied from the negative supply ($-48V$) to lead R. This is accomplished by the high gain current amplifier formed by transistor 400 and amplifying current mirrors 401–402 and 403–404 in conjunction with the current sensing resistor 110 and the precision voltage-to-current converter formed by transistors 405–406, resistor 407 and current generator 408. The precision voltage-to-current converter provides feedback to establish a precise current gain equal to the ratio of the values of resistor 110 to resistor 407. This current gain represents the ratio of the control current supplied to ring drive 111 via lead RD to the drive current supplied by ring drive 111 to lead R. Thus, the signal on lead RD is the control signal which establishes the level of loop current applied to lead R. A similar configuration is employed in tip drive 113 which functions to control the drive current applied from the positive supply (circuit ground) to lead T.

Current Drive Generator 116

Figure 3:
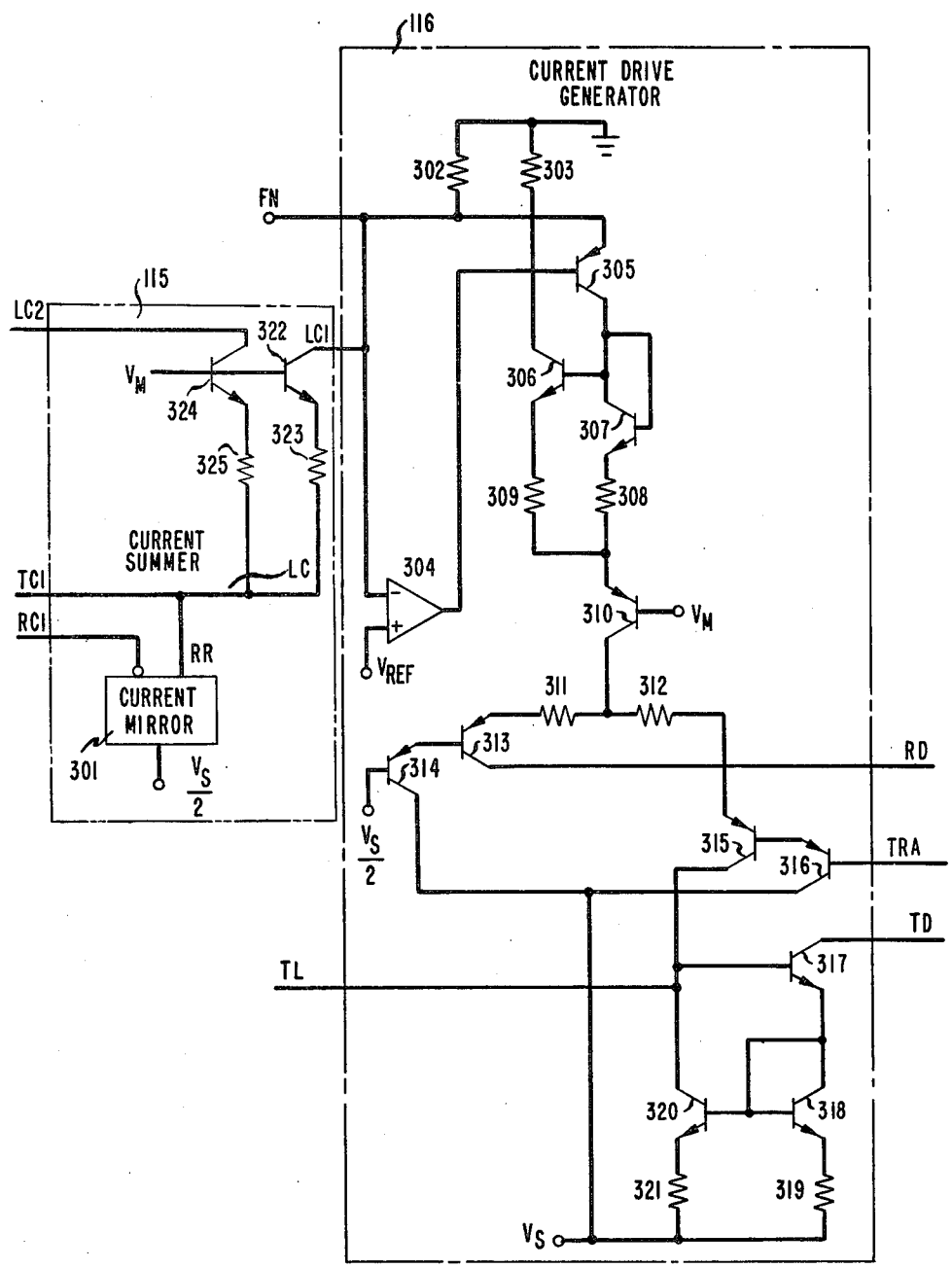
FIG. 3 illustrates the current summer circuit and the current drive generator circuit of the subject switchhook status detector.

The control signals appearing on leads RD and TD of FIG. 1 contain a number of components, the primary one is supplied by current drive generator 116 of FIG. 3. This circuit contains a drive current level generator consisting of resistor 302, transistor 305 and operational amplifier 304 which function to establish an "error drive current signal" for the remainder of the circuit. This error drive current signal consists of a reference drive current signal, which represents the "nominal" current to be supplied to the communication pair (R, T), modified by a feedback signal comprising a portion of the sum current which represents the actual loop current flowing on the communication pair (R, T). Thus, the error drive current signal is the drive supplied to both the drive circuits (111, 113) to provide the desired loop current to the communication pair (R, T). This is accomplished by operational amplifier 304 driving the base of transistor 305 so that the voltage across resistor 302 is equal to the + input appearing on the terminal voltage ($V_{REF}$) of operational amplifier 304. The resulting current through resistor 302 is one component of the "reference drive current signal." This current is precisely equal to voltage $V_{REF}$ divided by the resistance of resistor 302, while additional reference drive signal components are supplied via input FN. The desired error drive current signal is obtained by injecting a portion of the sum current on lead LC (as determined by the current split caused by resistor 323 through transistor 322 and resistor 325 through transistor 324) at the emitter of transistor 305 (LC1). Thus, the emitter current of transistor 305 is the difference between the reference drive current and a predetermined portion of the sum current. This difference signal is the error drive current signal. Transistors 306, 307 and resistors 308, 309 amplify the error drive current. Transistor 310 isolates the current amplifier from the remaining circuitry and the remaining portion (LC2) of the sum current (LC) is used as an input to the hook status detector.

The above-mentioned amplified error drive current signal must be used to drive both ring drive 111 and tip drive 113. To accomplish this, the amplified error drive current signal must be split which is the function of the differential amplifier consisting of transistors 313–316 and the current mirror consisting of elements 317–321 which inverts the phase of the TD signal concurrently. The differential amplifier functions in standard fashion to split the amplified error drive current signal into two signals, with one of these two signals output directly to ring drive 111 via lead RD and the other of these two signals output to the aforementioned current mirror consisting of elements 317–321. This current mirror circuit is used to invert a portion of the amplified error drive current signal and apply it to lead TD since tip drive 113 supplies a drive current in the opposite direction of that supplied by ring drive 111 and requires a control current on lead TD in the opposite direction of the control signal on lead RD to accomplish this.

The battery feed circuit employs this amplified error drive current splitting circuit and isolation amplifier 117 of FIG. 1 in a feedback configuration to minimize the longitudinal potential on leads R and T. The first element of this feedback circuit is the isolation amplifier circuit 117 which detects the longitudinal potential on leads R and T of the communication pair. This is accomplished by isolation amplifier 117 monitoring the common mode voltage which appears on the communication pair, leads R and T, and applying a control signal on lead TRA to signify this voltage. In the absence of longitudinal potential, this control signal, ($V_S/2$), should equal one-half the supply voltage, thereby creating an equal split of amplified error current drive current by differential amplifier 311–316. In the presence of a longitudinal potential on leads R and T, isolation amplifier 117 will produce a control signal on lead TRA which is equal to the longitudinal potential. Differential amplifier 311–316 responds to this control signal on lead TRA from isolation amplifier 117 by altering the split of the amplified error current drive between leads RD and TD to counteract the longitudinal potential. Thus, isolation amplifier 117 provides feedback to current drive generator 116 to minimize the longitudinal potential at leads R and T of the communication pair. In this fashion, a current is generated on the communication pair (R, T) to control the effective longitudinal impedance of the battery feed circuit.

The basic difficulty with this arrangement, which is similar to that used in many prior art battery feed circuits, is that tip drive 113 and ring drive 111 would have to be precisely matched and linear in performance to insure that the currents being applied to each lead of the communication pair (R, T) are correct for maintenance of longitudinal balance. These same matching and linearity requirements would also apply to the differential amplifier and current mirror circuits. These matching and linearization problems increase the cost of circuit fabrication and introduce both an unwanted sensitivity and a source of error into the battery feed circuit. Thus, the battery feed circuit relys on feedback circuitry to eliminate the need for this circuit matching, as described hereinbelow.

Precision Isolation Amplifier

Figure 7:
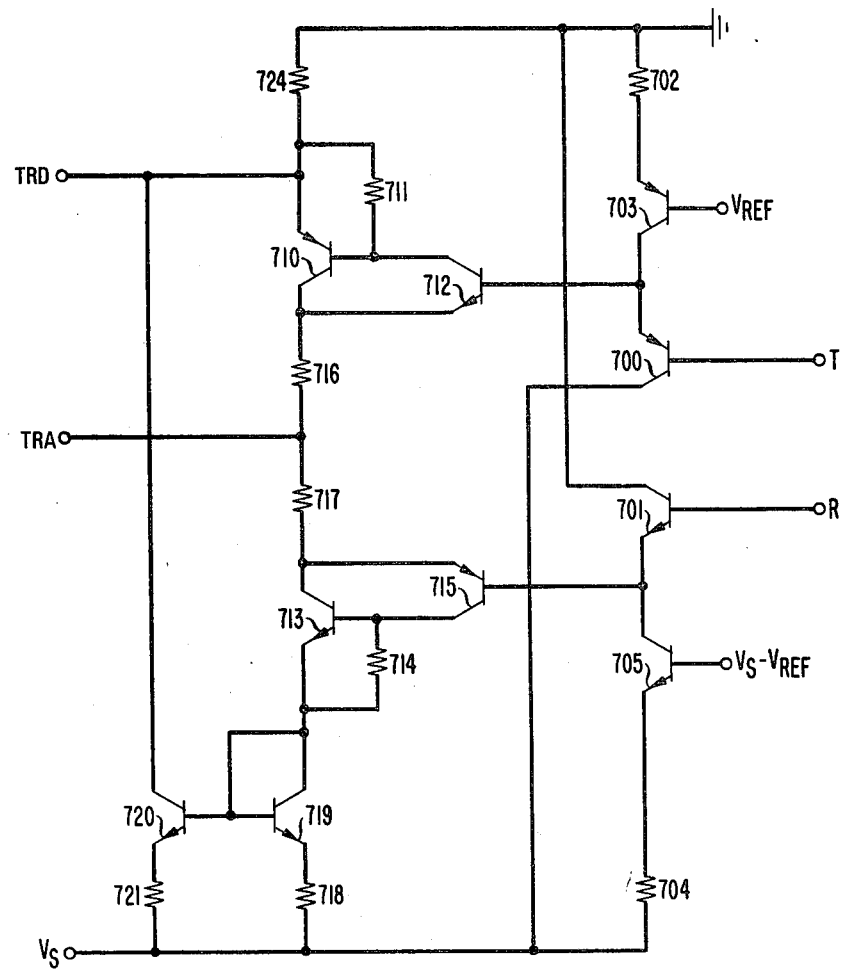
FIG. 7 illustrates the precision isolation amplifier of the subject switchhook status detector.

Precision isolation amplifier circuit 117 is illustrated in FIG. 7 wherein the amplifier input terminals are connected to a communication pair, leads R and T, which leads have voltage signals ($V_R$ and $V_T$) on them that must be monitored. One amplifier output terminal is connected to lead TRA. The output signal appearing on lead TRA represents the average of the voltage signals appearing on leads R and T. As is evidenced from the drawing, the subject precision isolation amplifier circuit is substantially symmetrical about a center line that might be drawn horizontally across FIG. 7 from lead TRA to the mid-point between the input leads R and T. To simplify the description of this circuit, only one portion of the symmetric circuitry will be described.

To begin the description of this circuit it is advantageous to discuss the up/down emitter follower circuit consisting of elements 700, 710–712. Transistors 710 and 712 comprise a well-known composite transistor configuration which, with bias resistor 711, evidences the characteristics of high current gain and high input impedance. Thus, only a small input current is required to activate this circuit and to produce a high current output, thereby minimizing the load on the input signal source. This high input impedance is necessary to avoid loading the communication pair since if this impedance were unbalanced, the battery feed circuit would be unbalanced. It is also significant to note that the voltage at the emitter of transistor 712 is equal to the voltage at the base of transistor 712 less the base-emitter voltage drop ($V_{BE712}$) of transistor 712. It is apparent from FIG. 7 that by inserting transistor 700 and by making the base-emitter voltage drops of transistor 700 ($V_{BE700}$) and 712 ($V_{BE712}$) identical, the voltage appearing on lead T ($V_T$) will be identically reproduced at the emitter of transistor 712. Adequate base-emitter matching is easily accomplished by the appropriate controls over the manufacture of these transistors (710, 712) or by selection of the transistors used to implement this circuit. In addition, the input impedance seen at the base of transistor 700 is beta times the input impedance seen at the base of transistor 712. The input impedance of the precision isolation amplifier will therefore be very high since the composite of transistors 710 and 712, already has a very high input impedance.

To insure the consistency of operation of the circuit over a wide range of input signals, the operating characteristics of transistor 700 are stabilized by supplying transistor 700 with a constant current by way of the constant current source comprising resistor 702, transistor 703 and the voltage source $V_{REF}$. Therefore, any voltage signal $V_T$ appearing on lead T will be applied to the very high input impedance of the base of transistor 700 and this voltage signal will be replicated at the emitter of transistor 712. Due to the obvious symmetry of this circuit, an identical situation exists for lead R and the voltage appearing thereon ($V_R$) will appear on the emitter of transistor 715.

As evidenced from the structure of resistors 716 and 717, the voltage appearing at the junction of these two elements will be one-half the sum of the voltages appearing on leads R and T ($V_R$, $V_T$) if the value of these two resistors are identical.

In addition to the generation of a longitudinal reference on lead TRA, the isolation amplifier produces a precise metallic or differential voltage reference on lead TRD. This is partially accomplished by passing both the emitter current of transistor 710 and the current through resistor 711 through resistor 724 to ground. Since the base current of transistor 712 is extremely small, the sum of these currents is approximately equal to the current through resistors 716 and 717. Since the voltage at the emitter of transistor 712 is equal to the voltage $V_T$ on lead T and the voltage at the emitter of transistor 715 is equal to the voltage $V_R$ on lead R, the current through resistors 716 and 717 is proportional to the difference between the voltages on leads T and R and, therefore, the voltage across resistor 724 is proportional to the difference between the voltages on leads T and R. One source of error in the configuration just described is that any load placed on the output of the precision isolation amplifier (lead TRA) will draw current through resistor 716, therefore unbalancing this configuration. To eliminate the affect of this imbalance, the current mirror comprised of elements 718–721 supplies an error correcting signal current to the circuit load resistor 724 to thereby return balance to this circuit. This precise metallic voltage is important, as described below, for ac transmission, terminating impedance generation and dc current feed control.

Current Magnitude Feedback

The magnitude of current supplied to the communication pair (R, T) is controlled via the drive signals appearing on leads RD and TD, which signals activate tip drive 113 and ring drive 111, respectively. The reference drive current signal was described above and represents the nominal value of the current to be applied to the communication pair (R, T). However, it is obvious that for various loads and circuit conditions this reference drive must be modified to establish the proper level of current on communication pair (R, T).

An important feature of the battery feed circuit is the current magnitude portion (114, 115) of the feedback circuit. This circuitry functions to precisely sense the actual currents flowing on leads R and T and extract the metallic components from these currents by generating a sum signal. This sum signal is then subtracted from a reference and the result of this subtraction is amplified and used to drive control leads RD, TD to thereby control the current supplied to the communication pair (R, T).

Current Sensor 114

Figure 2:
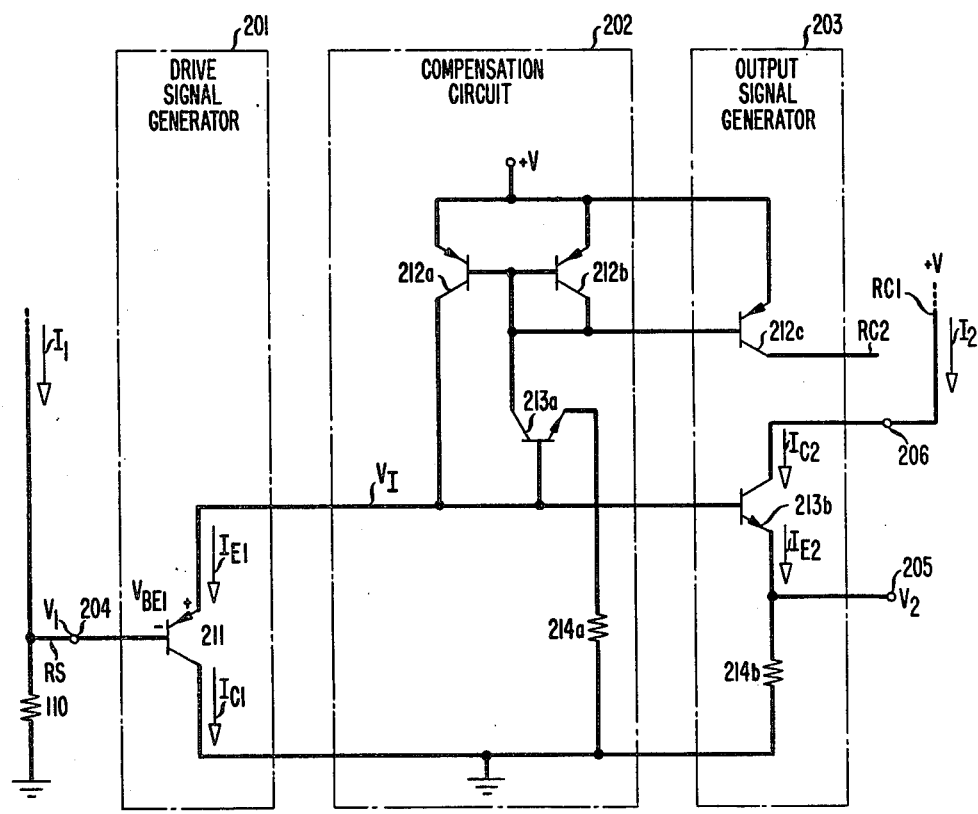
FIG. 2 illustrates the current sensor circuit of the subject switchhook status detector.

Current sensor circuit 114 of FIG. 1 is comprised of two sensor circuits (120, 121) each of which monitors one of the leads of the communication pair (R, T). For the sake of illustration, only sensor circuit 121 which monitors lead R will be described and the preferred embodiment of this circuit is illustrated in FIG. 2. The −48V potential of FIG. 1 is used as a ground reference in FIG. 2, to clarify the circuit operation. This circuit functions to monitor a particular voltage signal and produces an output voltage signal which is virtually identical to the signal that is monitored. In addition, the sensor circuit converts the monitored input signal voltage to a precise output current. The circuit is shown in FIG. 2 and comprises three basic elements, which are: a drive signal generator 201, an output signal generator 203 and compensation circuit 202. As is illustrated in FIG. 2, the signal to be monitored, such as voltage $V_1$, is applied to input terminal 204 and drive signal generator 201 produces a drive signal, $V_I$, which signal activates output signal generator 203, thereby producing output voltage $V_2$ at output terminal 205. As is evident from the drawing, voltage $V_I$ is equal to input voltage $V_1$ plus the base-emitter voltage drop ($V_{BE1}$) across transistor 211. Output voltage $V_2$ is equal to drive signal $V_I$ less the base-emitter voltage drop ($V_{BE2}$) across transistor 213b. Therefore, for output voltage $V_2$ to match input voltage $V_1$, the base-emitter drop ($V_{BE1}$, $V_{BE2}$) across these two transistors (211, 213b) must be equal. It is this equivalence of base-emitter voltage drops that is assured by compensation circuit 202.

Drive Signal Generator 201

For the sake of clarity, assume that an input signal voltage $V_1$ is applied to terminal 204. This voltage is generated by the loop current $I_1$ flowing into resistor 110 thereby generating the signal of interest, voltage $V_1$. It is important to note that an error in this current-to-voltage transformation is caused by the base current of transistor 211 which flows through resistor 110 causing an increase in voltage $V_1$ which is equal to the base current times the value of resistor 110. As will be shown, the subject circuit functions to force the collector current of transistor 211 to be proportional to $V_1$. Since the base current of a transistor is proportional to its collector current, the base current of transistor 211 is therefore proportional to $V_1$. Thus, the resulting error is equivalent to a high value negative resistor in parallel with resistor 110 and this error can be completely compensated for by slightly decreasing the value of resistor 110.

Terminal 204 is directly connected to the base of transistor 211 and, therefore, voltage $V_1$ serves to bias the base of transistor 211 (which operates in the linear active region) and current flows into the emitter of transistor 211 and through the collector of transistor 211 to circuit ground. This aforementioned current flow generates a voltage $V_{BE1}$ which is the base-emitter voltage drop of transistor 211. Therefore, transistor 211 acts as a unity gain voltage amplifier and the drive signal $V_I$ at the emitter terminal of transistor 211 is the input signal voltage $V_1$ plus an error signal which is this base-emitter voltage drop $V_{BE1}$.

Output Signal Generator 203

Drive signal voltage $V_I$ activates transistor 213b since the base of this transistor (213b) is directly connected to the emitter terminal of transistor 211. The collector of transistor 213b may be connected in any one of a number of configurations and what is shown is a connection to a source of potential designated as +V. With this particular connection, drive signal $V_I$ biases transistor 213b causing current to flow from the source of potential +V through output terminal 206 of the subject circuit to the collector and thence to the emitter of transistor 213b where the current is returned to circuit ground through resistor 214b. Output terminal 205 is directly connected to the emitter of transistor 213b and is typically used to obtain the voltage output $V_2$ of the circuit, whereas output terminal 206 can obviously be used to obtain a current output I₂, which current is proportional to the voltage V₂. Since transistor 213b also acts as a unity gain voltage amplifier, the output voltage will be drive signal V_I minus a second error signal which is the base-emitter voltage drop (V_BE2) of transistor 213b.

Compensation Circuit 202

As mentioned above, for the output voltage V₂ to match input voltage V₁, the base-emitter drops of transistors 211 and 213b must be identical. For this to be the case, compensation circuit 202 must function to supply transistor 211 with the identical emitter current to that flowing in transistor 213b if transistors 211 and 213b are sized for equal saturation currents. As described below, the base-emitter voltage drop of a transistor is a function of the collector or emitter currents flowing in that transistor and its saturation current. Therefore, if each of the two aforementioned transistors (211, 213b) can be controlled so that their current flows are identical and their saturation currents are equal, the base-emitter voltage drops will also be identical.

Compensation circuit 202 contains a current mirror circuit comprising transistors 212a and 212b. This current mirror circuit functions in well-known fashion to supply nearly identical currents through both legs of the current mirror circuit. In FIG. 2, one leg of the circuit is connected to the emitter terminal of transistor 211 and the other leg of the current mirror circuit is connected to the collector terminal of transistor 213a. With this being the case, the current flow through the emitter and collector terminals of transistors 211 and 213a respectively will be virtually identical. Therefore, the base-emitter voltage drops of these two transistors will also be virtually identical as will be shown hereinbelow. The emitter terminal of transistor 213a is connected to circuit ground through resistor 214a. To equalize the base-emitter voltage drop of transistor 213b with that of transistor 211, some form of coupling must obviously be provided. By manufacturing transistor 213a and 213b as an identically matched pair having a common base terminal and also manufacturing resistors 214a and 214b as identically matched resistors accomplishes the necessary coupling. With this being the case, since the emitter resistors of both transistors are identical, and both collectors are connected to voltage +V, the current flowing through both of transistors 213a and 213b will be identical, which achieves our stated purpose. Thus, the base-emitter voltage drops of transistor 211 and 213b will be virtually identical and will be controlled by transistor 213a and its associated current mirror circuit comprising transistors 212a and 212b.

V_BE Equality

The detailed circuit analysis of this configuration begins with an analysis of the base-emitter voltage drop of a transistor. As is well-known from basic circuit theory as described in any standard textbook such as on page 13 of "Analysis and Design of Analog Integrated Circuits", by P. R. Gray et al, published by John Wiley and Sons in 1977, the base-emitter voltage drop across a transistor is determinable from the following equation:

$$I_C = I_S \exp(V_{BE}/V_T) \tag{1}$$

where:
- I_S = Transistor Saturation Current (Proportional to emitter area)
- V_T = Transistor Thermal Voltage
- V_T = (KT/q)
- K = Boltzmans Constant,
- T = Absolute Temperature,
- q = Electron Charge.

Dividing both sides of equation (1) by I_S, taking the natural log of both sides, and multiplying both sides by V_T gives:

$$V_{BE} = V_T \ln(I_C/I_S) \tag{2}$$

It is clear from this equation that if transistors 211 and 213b are designed to have equal saturation currents (I_S's), the difference in V_BE's between the two transistors in question will be determined by the differences in their respective collector currents. As we discussed above, the current mirror circuit and the coupling between transistors 213a and 213b guarantee that:

$$I_{E1} = I_{C2}$$

but, from basic transistor theory:

$$I_{C1} = I_{E1} - I_{B1}$$

Therefore, it is obvious that the difference in the base-emitter voltage drop between transistors 211 and 213b will be due solely to the small base current of transistor 211 which will be insignificant in relation to the magnitude of the emitter and collector currents flowing in this transistor. Thus, the V_BE as specified by equation (2) above will be effectively determined by the I_C term which is nearly identical for both transistors (211, 213b). Therefore, it can be said that, to a very high degree of accuracy, the base-emitter voltage drops of these two transistors are identical. Therefore the disclosed circuit performs the required function which is monitoring an input signal and producing an output signal that is identical to the monitored input signal.

Output Current

In the discussion above, the subject circuit was described in terms of a voltage-to-voltage converter with the output of the circuit being voltage V₂ which was obtainable at terminal 205. However, the subject circuit also functions as a voltage-to-current converter with a current output being available at terminal 206. This output current I₂ is proportional to V₂ with the relationship being:

$$I_2 = V_2/R_{214b} \tag{3}$$

where R_{214b} is the resistance value of resistor 214b. But since V₁ = V₂ in this circuit, the current I₂ is given by:

$$I_2 = V_1/R_{214b} \tag{4}$$

to a high degree of accuracy. The sources of error in this signal are the inequalities between V₂ and V₁ discussed above and also the fact that the current through resistor 214b is in actuality current I₂ plus the base current of transistor 213b. Thus, this base current, which is a factor of beta (of transistor 213b) smaller than current I₂, must be compensated for in order for equation (4) above to be precisely correct. In summary, the sensor circuit of FIG. 2 constitutes a precise current sensor having a current gain equal to the ratio of values of resistor 110 to resistor 214b.

Current Summer 115

The output of each of current sensor circuits 121, 120 is applied to leads RC1 and TC1, respectively, which signals are operated on by current summer circuit 115. Current summer circuit 115 is illustrated in FIG. 3 and comprises a current mirror circuit 301, the operation of which is well-known in the art and need not be described herein. Basically, the current signal appearing on lead RC1 is reflected in inverted form by current mirror 301 onto output lead RR and this signal is combined with the signal appearing on lead TC1 to generate the sum signal on lead LC. By summing these two current signals on leads RC1 and TC1, the balanced longitudinal current components cancel and what remains is a signal current which is proportional to the actual metallic current flowing on the communication pair (R, T), which signal is output on lead LC. Transistor 322 and resistor 323 (in conjunction with transistor 324 and resistor 325) splits off a predetermined portion of the current on lead LC and applies same to current drive generator 116 through lead LC1. The remaining portion of the current from lead LC is applied through lead LC2 to threshold circuit 502 as one of the inputs to the switchook status detector.

Current Drive Generator 116

Operational amplifier 304 functions to establish the reference drive current signal by forcing (in well-known fashion) the voltage on terminal FN to be equal to $V_{REF}$. This voltage causes an accurately determined current to flow through resistor 302. The signal on lead LC1 represents the actual metallic current flowing on the communication pair (R, T). This signal is subtracted from the current flowing through resistor 302 and the difference current is the error drive current signal which is applied to the current splitter circuit (311–321) via transistor 305, the current amplifier consisting of resistors 308, 309, transistors 306, 307 and buffer transistor 310.

This feedback arrangement just described, functions in a dynamic fashion (via negative feedback) to assure that there is no metallic error current due to the induced longitudinal currents. This condition is assured since the difference current in this feedback circuit is a function only of the metallic current and not of the longitudinal current.

Power Down and Ringing Modes

The normal battery feed operation has just been described and there exists two other operational states of interest for this description. The first of these is the power down mode where the associated station set is on-hook and much of the battery feed circuit is turned off to conserve power. However, hook status must be operational, so a small leakage current is supplied to leads R and T to monitor the on-hook/off-hook status of the communication pair (R, T). The generation of the leakage drive control current signals is described below. These signals are applied to lead RD via lead RL in current summing fashion as shown in FIG. 1 and in a similar fashion via lead TL and the current mirror (317–321) of FIG. 3.

The remaining operational state of interest is ringing and a ringing capability current signal for tip drive is generated as described below. This signal is applied via lead RNG to lead TD as shown in FIG. 1. This ringing capability current functions to significantly increase the current handled by tip drive 113 so that during one phase of ringing, the electronic battery feed provides a ringing current return path. This eliminates the need for a relay (as in prior art circuits) to supply this function.

Threshold Circuit 118

The sum signal on lead LC2 represents the sum of the metallic currents flowing on each of leads R and T while the signals on leads RC1 and TC1 represent (to a high degree of accuracy) the actual current flowing on each of leads R and T, respectively. Since the signals on leads RC1 and TC1 are used to control the application of loop current to leads R and T (as described below), comparable signals need be generated for on-hook/off-hook status indication purposes rather than using, and possibly disturbing, the signals on leads RC1 and TC1. Therefore, leads RC2 and TC2 are used to supply the necessary signals. The current sensor circuit of FIG. 2 contains an additional current mirror transistor 212c for this purpose and, as described above, the collector of transistor 212c (and lead RC2) carries a current which represents the actual value of input current $I_1$.

Figure 5:
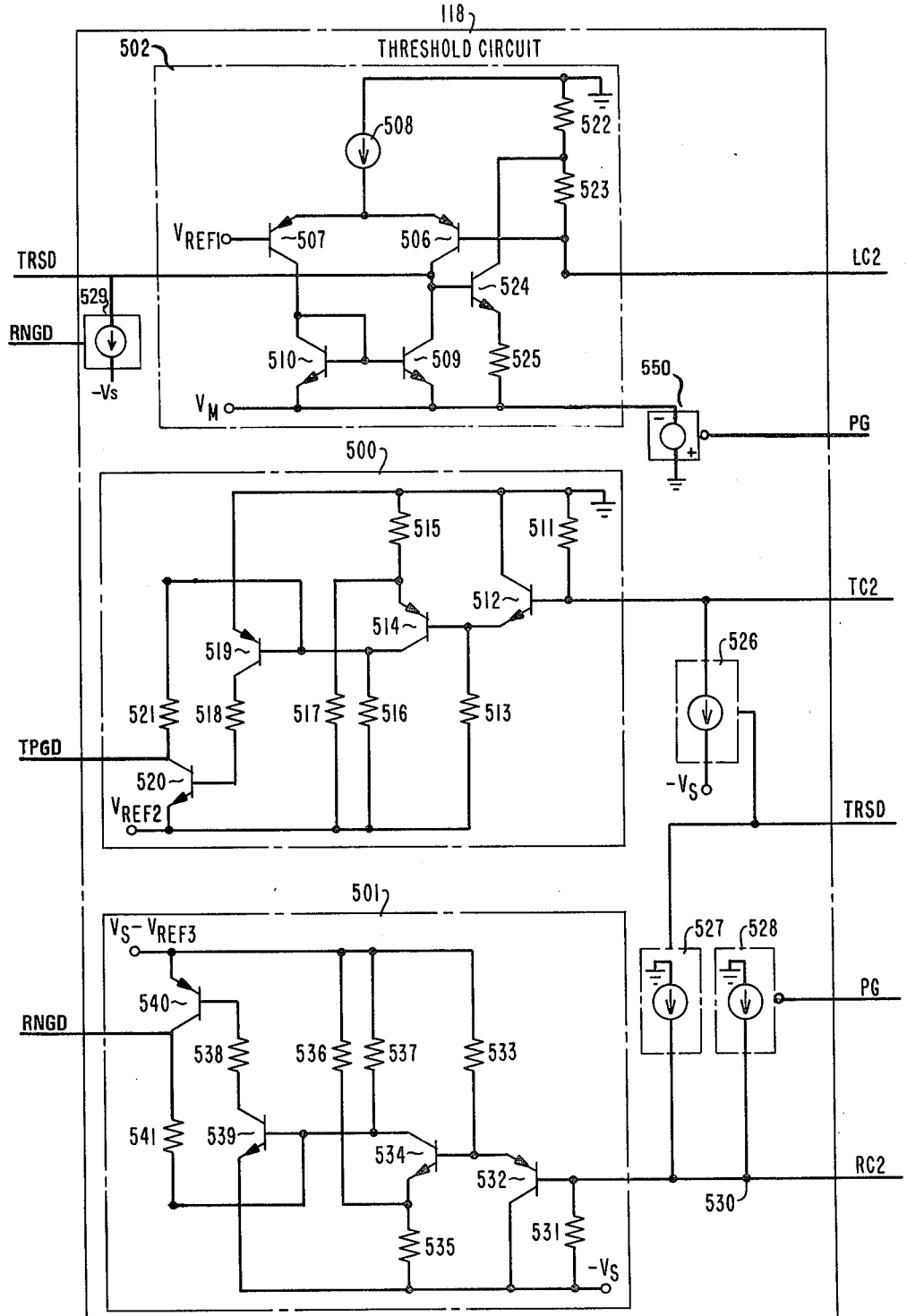
FIG. 5 illustrates the threshold circuits of the subject switchhook status detector.

These three current signals (RC2, TC2, LC2) are then applied to threshold circuit 118 on FIG. 5 which comprises the various threshold determining circuits 500, 501 and 502. In threshold circuit 502, lead LC2 is connected to a current comparator circuit 502 which is comprised of resistors 522, 523, 525, transistors 506, 507, current mirror transistors 509, 510 and hysteresis control transistor 524. Transistors 506 and 507 operate in standard fashion to compare the signal which appears on the base of transistor 506 with a reference signal $V_{REF1}$ and, when the voltage on the base of transistor 506 exceeds this threshold, an output is generated on lead TRSD. To prevent the toggling of this circuit by noise, transistor 524 and resistor 525 provide positive feedback to give this comparator hysteresis.

Threshold circuit 502 contains two additional inputs RNGD and PG. Input RNGD activates current source 529 to inhibit output signal TRSD. The PG input deactivates voltage source 550 to inhibit signal TRSD.

Leads RC2 and TC2 are each connected to a respective threshold circuit which provides a second and a third reference, which references reflect the existence of sufficient current on the associated lead of the communication pair to indicate a valid signal thereon. Lead TC2 is connected to a threshold circuit 500 which comprises elements 511 to 521. This combination of elements comprises a simple current comparator circuit with hysteresis and is identical in structure to the threshold circuit 501 comprising elements 531 to 541 which is used to monitor lead RC2. The circuit composed of transistors 512 and 514 and resistors 511, 513, 515, 516, and 517 is a current comparator. The switching of this circuit is dependent upon the base voltage of transistor 512 which is, in turn, dependent on the value of resistor 511 and the input current on lead TC2. For zero input current, the voltage at the base of transistor 512 is zero and transistor 514 is held off. This causes the voltage at the base of transistor 519 to be high enough to activate the flip-flop consisting of transistors 519, 520 and resistors 518, 521. This circuit operates when transistor 519 turns on, providing base current to transistor 520 which, in turn, is activated. The collector current of transistor 520 flows through resistor 521 further increasing the base drive of transistor 519, and thereby latching the flip-flop on. This state continues until the input current on lead TC2 reaches the threshold level and transistor 514 turns on. The base voltage of transistor 519 is pulled more positive than the threshold voltage of the flip-flop which, in turn, causes the flip-flop to reset. Suffice it to say, that the signals appearing on leads RC2 and TC2 are respectively compared to predetermined thresholds. When these signals exceed their associated thresholds, the logic outputs are provided on the associated conductors RNGD and TPGD.

The control signals on leads TPGD, RNGD, TRSD are input to hook status logic 119 and are used therein to provide all the hook status functions described above. To begin with, the subject circuit monitors lead T to make a preliminary determination of the busy/idle status of the communication pair (R, T). Threshold detector 500 provides an output signal on lead TPGD to indicate the presence/absence of current on lead T. If no current is flowing on leads T and R, lead TRSD is in a logic LOW state indicating the idle status of the communication pair (R, T). Similarly, lead TRSD activates controlled current source 527 to thereby block threshold circuit 501 from sensing the absence of current on lead RC2.

Once a current flows on lead T in excess of the predetermined threshold (as determined by threshold circuit 500 sensing a proportional current on lead TC2), the logic state of lead TPGD changes from LOW to HIGH, thereby enabling threshold circuit 501 by disabling controlled current source 528. This signal on lead TPGD, which is indicative of current flow on lead T, may be a true indication of the on-hook/off-hook status of the communication pair (R, T) or it may be a false indication caused by a fault condition. Thus, threshold circuit 501 is enabled to verify the status by monitoring the current on lead R. If no current is flowing on lead R and lead TPGD is HIGH and lead TRSD is LOW, then the circuit is in the ringing state, and the output of threshold circuit 501 (lead RNGD) is in the HIGH state. A ring current path to ground needs to be provided, and this is accomplished by controlled current source 624 of FIG. 6 being activated by threshold circuit 501 as represented by gate 638 and supplying a current on lead RNG which, as shown on FIG. 1, activates tip drive 113 to thereby enable ringing current to flow from lead T to circuit ground. Controlled current generator 529 is also activated by output lead RNGD of threshold circuit 501 going HIGH, and causes lead TRSD to switch to the LOW state thereby turning off the threshold circuit consisting of elements 506–510, 522–525.

If current were flowing on lead R in excess of a predetermined threshold (as determined by threshold circuit 501), this condition would be indicated by a LOW logic current signal on lead RNGD. The combination of current flow on both leads R and T usually indicates an off-hook condition, but induced longitudinal currents can exceed normal loop current in magnitude so the subject circuit employs an additional criteria to conclusively determine the status of the communication pair (R, T). This criteria is the flow of metallic current on the communication pair (R, T) as indicated by the sum-of-metallic currents signal appearing on lead LC2. This signal is compared to a predetermined threshold by the threshold circuit comprised of elements (506–510, 522–525) and the presence of sufficient metallic current on the communication pair (R, T) is indicated by this circuit placing a HIGH logic signal on lead TRSD.

Thus, the concurrent presence of sufficient current on leads R and T as well as sufficient metallic current is required to indicate an off-hook condition. However, strong induced longitudinal currents could cause the signals on leads RNGD and TPGD to erroneously change during the course of a normal off-hook state. Therefore, the HIGH logic signal on lead TRSD disables threshold circuits 500 and 501 via controlled current sources 526 and 527 respectively. For the signal on lead TRSD to change once an off-hook situation has been detected, the metallic current on the communication pair (R, T) must drop below the above-mentioned predetermined threshold, which would cause a change of the signal on lead TRSD to a LOW logic state.

Figure 6:
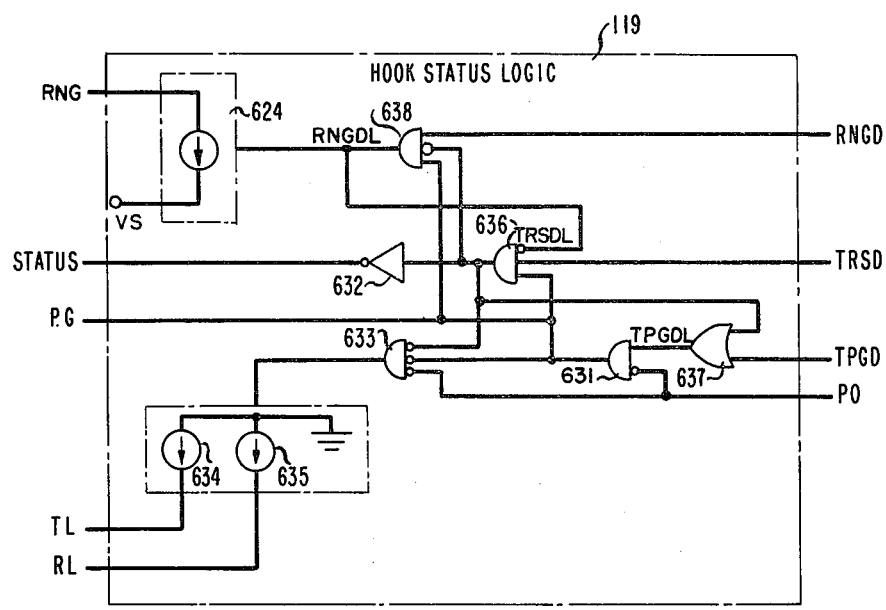
FIG. 6 illustrates the hook status logic of the subject switchhook status detector.

Hook Status Logic—FIG. 6

FIG. 6 represents a logic diagram which illustrates the logic circuitry necessary to perform the hook status determining function. As mentioned above, some of these gate functions are implemented by inhibiting or enabling signals in the threshold circuits of FIG. 5 while the remaining gates can be implemented in any number of ways. The exact details of this implementation are irrelevant for the purpose of this discussion of the logic functions being performed.

To simplify the description, the threshold functions being performed by threshold circuits 500, 501, 502 will be illustrated by corresponding logic signals on leads TPGD, RNGD, TRSD respectively on FIG. 6. Similarly, leads TPGDL, RNGDL, TRSDL are physically the same leads as leads TPGD, RNGD, TRSD on FIG. 5, but for illustration purposes are shown as separate leads on FIG. 6. This is because gates 637, 638, 636 perform the logic functions corresponding to the operation of controlled sources 526, 527, 528, 529 and 500 respectively, which controlled sources modify the logic signals which appear on leads TPGD, RNGD, TRSD thereby producing new signals, which are shown on FIG. 6 as appearing on leads TPGDL, RNGDL, TRSDL. Thus, gates 636–638 of FIG. 6 illustrate in digital logic form the logic signal combination functions being performed in threshold circuits 118.

In particular, the logic signals appearing on lead TPGD indicate the presence/absence of current on lead T, with the presence of current being indicated by a HIGH logic signal. This signal is propagated by gates 637, 631 to cause lead PG to be in the HIGH logic state, thereby enabling gate 638. The presence of current on lead R is indicated by a LOW logic signal on lead RNGD. Thus, when loop current flows on the communication pair (R, T), the logic signals appearing on leads TPGD and RNGD are propagated by gates 637 and 638 to leads TPGDL and RNGDL respectively, which signals enable gate 636. The presence of sufficient metallic current causes lead TRSD to go HIGH and gate 636 then allows lead TRSDL to be in a HIGH logic state. This prevents gates 637 and 638 from responding to changes in leads TPGD and RNGD and the switchhook status detector only monitors the metallic current for the remainder of the off-hook condition. In addition, gate 632 functions to invert the logic state appearing on lead TRSDL and produce a TTL-compatible output signal on lead STATUS which represents the on-hook/off-hook status of the communication pair (R, T).

Leakage Control Currents

The existence of leakage control currents was mentioned above, and the generation of these are illustrated on FIG. 6. Current generators 634–635 serve this function of generating the leakage control currents and these are disabled by gate 633 once an off-hook condition is detected as indicated via the appropriate signal on lead TRSD. One additional feature of this circuit is the external power-off capability supplied via lead PO. By placing a HIGH logic signal on lead PO, gate 631 and thus lead PG can be forced into an "on-hook" status mode wherein the battery feed circuit is in the power down mode. Lead PG controls the low voltage supply bus (voltage $V_M$) and in the "on-hook" status mode turns off all unnecessary circuitry. For example, current drive generator 116 is controlled by operational amplifier 304 which, in turn, is controlled by the low voltage signal on lead $V_M$ which is switched on (controlled voltage source 550) by lead PG. The logic signal on lead PO also, via gate 633, eliminates the leakage control current, thereby completely rendering the battery feed in the off state.

While a specific embodiment of the invention has been disclosed, variations in structural detail, within the scope of the appended claims, are possible and are contemplated. There is no intention of limitation to what is contained in the abstract or the exact disclosure as herein presented. The above-described arrangements are only illustrative of the application of the principles of the invention. Normally, other arrangements may be devised by those skilled in the art without departing from the spirit and the scope of the invention.

What is claimed is:

1. A status detector circuit for indicating the on-hook or off-hook state of an associated communication pair (T, R,) having first (T) and second (R) conductors CHARACTERIZED BY:

sensor means (114) connected to said communication pair (T, R,) and responsive to the current flowing thereon for generating a first and a second current signal representative of the actual current flowing on said first (T) and said second (R) conductors respectively;

current summer means (115) connected to said sensor means (114) and responsive to said first and said second current signals for generating a current sum signal representative of the sum of the metallic currents on said communication pair (T, R,):

threshold means (118) connected to said sensor means (114) and said current summer means and responsive to said first and said second current signals and said current sum signal for generating first (TPGD) and second (RNGD) line status signals and a (TRSD) sum status signal representative of the presence of at least a predefined quantity of current associated with said first and said second current signals and said current sum signal as generated from said communication pair (T, R,); and hook status logic means (119) connected to said threshold means (118) and responsive to said first (TPGD) and said second (RNGD) line status signals and said (TRSD) sum status signal for generating a status signal (STATUS) indicative of the actual on-hook/off-hook status of said communication pair (T, R,).

2. The invention of claim 1 wherein said hook status logic means (119) is additionally CHARACTERIZED BY:

combining means responsive to said first (TPGD) and said second (RNGD) line status signals and to said (TRSD) sum status signal for generating a signal indicative of the existence of an off-hook state of said communication pair (T, R,) only when said first (TPGD) and said second (RNGD) line status signals and said (TRSD) sum status signal concurrently indicate the presence of at least a predefined quantity of actual current on the associated conductors (T, R,).

3. The invention of claim 2 wherein said threshold means (118) is additionally CHARACTERIZED BY:

first comparator means (500) responsive to said first current signal for comparing said first current signal to a first predefined threshold to generate said first line status signal (TPGD) only when said first current signal exceeds said first predefined threshold.

4. The invention of claim 3 wherein said threshold means (118) is additionally CHARACTERIZED BY:

second comparator means (501) responsive to said second current signal for comparing said second current signal to a second predefined threshold to generate said second line status signal (RNGD) only when said second current signal exceeds said second predefined threshold.

5. The invention of claim 4 wherein said threshold means (118) is additionally CHARACTERIZED BY:

third comparator means (502) responsive to said current sum signal for comparing said current sum signal to a third predefined threshold to generate said (TRSD) sum status signal only when said current sum signal exceeds said third predefined threshold; and wherein said first, second and third comparator means determine the existence of an off-hook state of said communication pair (T, R,) only when said first, second line and third thresholds are concurrently exceeded.

6. The invention of claim 5 wherein said hook status logic means (119) is additionally CHARACTERIZED BY:

line status disabling means responsive to said signal indicative of the existence of an off-hook state of said communication pair (T, R,) from said combining means for disabling said threshold means (118) to prevent noise on said communication pair (T, R,) from altering the state of said first (TPGD) and/or said second (RNGD) line status signals for the duration of the off-hook condition.

7. The invention of claim 6 wherein said hook status logic means (119) is additionally CHARACTERIZED BY means only responsive to said current sum signal (TRSD) for determining the transition from an off-hook state to an on-hook state of said communication pair (T, R,).

8. The invention of claim 1 wherein said sensor means (114) is additionally CHARACTERIZED BY:

first (120) and second (121) sense means connected respectively to said first (T) and said second (R) conductors for generating said first and said second current signals respectively representative of the actual current flowing on the associated conductors (T, R).

9. A method of determining the on-hook or off-hook state of a communication pair having first (R) and second (T) leads, comprising the steps of:

monitoring the actual current on each of said first (R) and said second (T) leads of said communication pair to sense the current on each lead, respectively;

CHARACTERIZED IN THAT said method includes the steps of:

summing said sensed currents to cancel the longitudinal components of said sensed currents and to produce a sum signal comprising only the metallic component of said sensed currents;

comparing said sensed currents and said sum signal with a like number of threshold values; and generating an off-hook indication only when said sensed currents and said sum signal all concurrently exceed their respectively thresholds.

10. The invention of claim 9 wherein said step of generating is additionally CHARACTERIZED BY the step of:
 disabling the comparing of said sensed currents with their associated thresholds when an off-hook determination is made; and
 removing said off-hook indication only when said sum signal fails to exceed its associated threshold, indicating insufficient loop current.

11. The invention of claim 1 wherein said status detector circuit is additionally CHARACTERIZED BY:
 driving means (116, 111, 113, 117) connected to said current summer means (115) and said hook status logic means (119) and responsive to the receipt of said current sum signal and a hook status signal for generating drive current signals indicative of said actual on-hook/off-hook status as current feedback to said communication pair (T, R).

12. The invention of claim 11 wherein said driving means (116, 111, 113, 117) is additionally CHARACTERIZED BY:
 current drive generating means (116) for generating a first error drive current signal (RD) and a second error drive current signal (TD);
 ring drive means (111) connected to said current drive generating means (116) and said hook status logic indicative of said actual on-hook/off-hook status signal (RL) for applying a signal (RS) to said sensor means (114) to control the current on one conductor (R) of said communication pair; and
 tip drive means (113) connected to said current drive generating means (116) and said hook status logic means (119) and responsive to the receipt of said second error drive current signal (TD) and to a second actuating signal (RNG) indicative of said actual on-hook/off-hook status for applying a signal (TS) to said sensor means (114) to control the current on one conductor (T) of said communication pair.

* * * * *